United States Patent [19]

Fandrianto

[11] Patent Number: 4,939,686
[45] Date of Patent: Jul. 3, 1990

[54] METHOD AND APPARATUS FOR SHARED RADIX 4 DIVISION AND RADIX 4 SQUARE ROOT

[75] Inventor: Jan Fandrianto, Los Gatos, Calif.

[73] Assignee: Weitek Corporation, Sunnyvale, Calif.

[21] Appl. No.: 361,802

[22] Filed: May 30, 1989

Related U.S. Application Data

[63] Continuation of Ser. No. 52,092, May 18, 1987, abandoned.

[51] Int. Cl.[5] ............................................. G06F 7/52
[52] U.S. Cl. .................................... 364/752; 364/767
[58] Field of Search ........................ 364/752, 767, 748

[56] References Cited

U.S. PATENT DOCUMENTS

| | | | |
|---|---|---|---|
| 3,631,230 | 12/1971 | Chen | 364/752 |
| 3,733,477 | 5/1973 | Tate et al. | 364/767 |
| 4,320,464 | 3/1982 | Desmonds | 364/767 |
| 4,477,879 | 10/1984 | Wong | 364/752 |
| 4,607,343 | 8/1986 | Cherillat et al. | 364/752 |
| 4,722,069 | 1/1988 | Ikeda | 364/767 |

OTHER PUBLICATIONS

Tan, "Uniform 2 Bits Quotients Binary Division by Carry-Save Adders", *IBM Tech. Disclosure Bulletin*, vol. 14. No. 11, Apr. 1972, pp. 3279-3281.
Y. W. Sing et al., "32-bit data-path chip heralds next generation of floating-point tasks", Design Entry, (Elec. Des., 5/29/86).
G. S. Taylor, "Compatible Hardware for Division and Square Root[1]", IEEE 1981, pp. 127-134.
Kishor S. Trevedi et al., "On-Line Algorithms for Division and Multiplication", IEEE, vol. C-26, No. 7, 7/77, pp. 681-687.
G. S. Taylor, "Radix Four Division Using Redundant Remainder and Quotient Representations", pp. 1-5.
Daniel E. Atkins, "Higher-Radix Division Using Estimates of the Divisor and Partial Remainders", IEEE, vol. C-17, No. 10, 10/68, pp. 925-934.

*Primary Examiner*—David H. Malzahn
*Attorney, Agent, or Firm*—Townsend and Townsend

[57] ABSTRACT

An improved logic structure and a method for implementing the same to perform division and square-root operations for radix four and higher is disclosed. The divsion and square-root bits are generated by a non-restoring method with the partial remainder, partial radicand, quotient and root all in redundant form. The partial remainder/radicand is stored in a series of sum and carry registers. The upper bits from these registers are supplied to a carry look-ahead adder for conversion to non-redundant form. These upper bits are then used to select a next divisor or root from a prediction programmable logic array (PLA). The output of the prediction PLA is supplied to a quotient/root register and a divisor/root multiple selector. The output of the selector is supplied to a carry save adder which has its output provided back to the input of the partial remainder/radicand sum and carry registers. The system of the present invention allows both division and square root calculations to be done with the same hardware. The square-root algorithm requires an initial look-up PLA for determining the initial bits of the square-root. Logic is provided for coupling the output of this initial look-up PLA to the quotient/root register and divisor/root multiple select during the first few iterations.

12 Claims, 5 Drawing Sheets

SRT DIVISION/SQUARE-ROOT GRAPH OF REDUNDANCY (P-D PLOT)

NEXT DIVISOR/ROOT SELECTION PLA

DIVISOR/ROOT $1 + \frac{x}{16}$

| PARTIAL REMAINDER RADICAND \ x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 00.00 | 0 | 0 | 0 | 0 | 0 | 0 | 0 | 0 | 0 | 0 | 0 | 0 | 0 | 0 | 0 | 0 |
| 00.01 | 0 | 0 | 0 | 0 | 0 | 0 | 0 | 0 | 0 | 0 | 0 | 0 | 0 | 0 | 0 | 0 |
| 00.10 | 1 | 1 | 1 | 1 | 1 | 0 | 0 | 0 | 0 | 0 | 0 | 0 | 0 | 0 | 0 | 0 |
| 00.11 | 1 | 1 | 1 | 1 | 1 | 1 | 1 | 1 | 1 | 1 | 1 | 1 | 1 | 1 | 1 | 1 |
| 01.00 | 1 | 1 | 1 | 1 | 1 | 1 | 1 | 1 | 1 | 1 | 1 | 1 | 1 | 1 | 1 | 1 |
| 01.01 | 1 | 1 | 1 | 1 | 1 | 1 | 1 | 1 | 1 | 1 | 1 | 1 | 1 | 1 | 1 | 1 |
| 01.10 | 2 | A | B | 2 | 2 | 2 | 2 | 2 | 1 | 1 | 1 | 1 | 1 | 1 | 1 | 1 |
| 01.11 | 2 | 2 | 2 | 2 | A | 2 | 2 | 2 | 2 | 2 | 2 | 1 | 1 | 1 | 1 | 1 |
| 10.00 | 2 | 2 | 2 | 2 | 2 | 2 | 2 | A | 2 | 2 | 2 | 2 | 1 | 1 | 1 | 1 |
| 10.01 | 2 | 2 | 2 | 2 | 2 | 2 | 2 | 2 | 2 | 2 | 2 | 2 | 2 | 2 | 2 | 2 |
| 10.10 | 2 | 2 | 2 | 2 | 2 | 2 | 2 | 2 | 2 | 2 | 2 | 2 | 2 | 2 | 2 | 2 |
| 10.11 | 2 | 2 | 2 | 2 | 2 | 2 | 2 | 2 | 2 | 2 | 2 | 2 | 2 | 2 | 2 | 2 |
| 11.00 | 2 | 2 | 2 | 2 | 2 | 2 | 2 | 2 | 2 | 2 | 2 | 2 | 2 | 2 | 2 | 2 |

NOTE: THERE ARE 3 BOXES OF A : NORMALLY = 2, BUT IF NEGATIVE AND XBIT = 1, = 1
THERE IS ONE BOX OF B : NORMALLY = 1, BUT IF POSITIVE AND XBIT = 1, = 2
TOTAL NUMBER OF TERMS : 19 TERMS

FIG._5.

LOOK UP PLA FOR PREDICTION OF THE FIRST 5 ROOT BITS

```
INPUTS        = 7 BITS    :  x(52) x(51) x(50) x(49) x(48) x(47) x(46)
OUTPUTS       = 5 BITS    :  r(4)  r(3)  r(2)  r(1)  r(0)
OUTPUT POLARITY           :  NEGATIVE TRUE
TERMS         = 28

PREVIOUS ROOT : 0.Q OR 0.(Q-1)

| SELECT | ROOT MULTIPLES (MAGNITUDE) |
|--------|----------------------------|
| 0      | 0 . 0  0  0   0   0  0  0  |
| +1     | 0 . 0  0  0   Q   0  0  1  |
| -1     | 0 . 0  0  0  Q-1  1  1  1  |
| +2     | 0 . 0  0  Q   0   1  0  0  |
| -2     | 0 . 0  0 Q-1  1   1  0  0  |

CHOICE OF ROOT MULTIPLES

FIG._7.

METHOD AND APPARATUS FOR SHARED RADIX 4 DIVISION AND RADIX 4 SQUARE ROOT

This is a continuation of application Ser. No. 07/052,092, filed May 18, 1987, now abandoned.

APPENDIX I shows examples of the calculations for a square-root.

Figure 2:
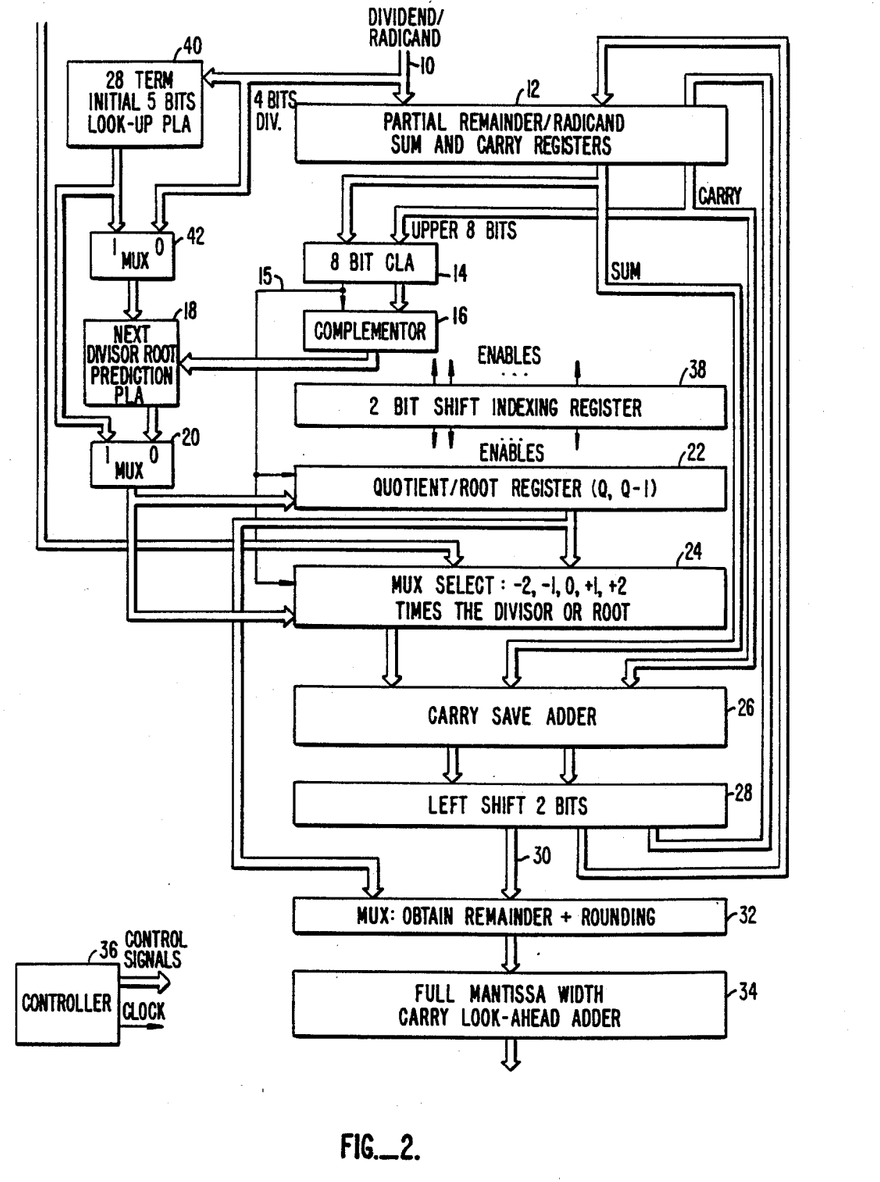
FIG. 2 is a block diagram of a shared radix 4 division and square-root circuit according to the present invention.

APPENDIX II is a computer program for operating the apparatus of FIG. 2 for division and square-root calculations.

BACKGROUND

Division and square-root are among the required operations in the IEEE floating point standard. Using the Newton-Ralphson iteration method to compute these functions (Hart et al., "Computer Approximation", New York, John Wiley and Sons, Inc., 1978 edition) does not satisfy the IEEE standard on the accuracy of the final result, even though the iteration has a speed advantage (converges quadratically) over many other algorithms, which often converge linearly. To obtain a correctly rounded number as specified by IEEE, hardware implementations of these two functions are generally done in a linear iterative algorithm, where one or more quotient/root bits are produced in each iteration. Naturally, the algorithm that can produce more and more bits per iteration, and/or can shorten the time to do one iteration, will give a better overall performance, but usually at the expense of more complexity in the implementation. Higher radix non-restoring division (SRT), as explained in a classic paper by Atkins (D. E. Atkins, "Higher-Radix Division Using Estimates of the Divisor and Partial Remainder." *IEEE Transactions on Computers*, 17, No. 10, October 1968, pp. 925-934), has been the basis of many hardware solutions (The term "radix" refers to the number of different numbers represented by each element. For binary representation, a radix 2 element has one bit, radix 4 has 2 bits, radix 8 has 3 bits, etc.). Radix 8 SRT division has been implemented in a VLSI chip, the Weitek WTL2264 (Weitek Corp., "WTL2264/WTL2265 Floating Point Multiplier/Divider and ALU", data sheet, July 1986). Restoring radix four division shared with radix two square-root has been built and reported by Taylor (G. S. Taylor, "Compatible Hardware for Division and Square Root", Proceedings of the 5th Symposium on Computer Arithmetic, May 1981, pp. 127-134). Non-restoring radix two square-root is described by Majerski, (S. Majerski, "Square-rooting Algorithms for High Speed Digital Circuits." IEEE Transactions on Computers, c34, No. 8, August 1985, pp. 724-733).

SUMMARY OF THE INVENTION

The present invention is an improved logic structure and a method for implementing the same to perform division and square-root operations for radix four and higher. The division and square-root bits are generated by a non-restoring method with the partial remainder, partial radicand, quotient and root all in redundant form. The partial remainder/radicand is stored in a series of sum and carry registers. The upper bits from these registers are supplied to a carry look-ahead adder for conversion to non-redundant form. These upper bits are then used to select a next divisor or root from a prediction programmable logic array (PLA). The output of the prediction PLA is supplied to a quotient/root register and a divisor/root multiple selector. The output of the selector is supplied to a carry save adder which also receives an input from the partial remainder/radicand registers and has its output provided back to the input of the partial remainder/radicand registers.

The system of the present invention allows both radix 4 division and radix 4 square-root calculations to be done with the same hardware. During division, the quotient is stored in the quotient/root register and is not supplied to the divisor/root multiple selector. During a square-root operation, on the other hand, the contents of the quotient/root register are combined with the next predicted root bits from the prediction PLA through the divisor/root multiple register. This is because of the nature of the square-root algorithm, which requires that the initial root be built on each time, as opposed to the division algorithm, which simply requires a new quotient bit at each iteration. The quotient/root is stored in Q and Q−1 forms to accommodate the square-root iteration. In addition, the square-root algorithm requires an initial look-up PLA for determining the initial bits of the square-root. Logic is provided for coupling the output of this initial hook-up PLA to the quotient/root register and divisor/root multiple select during the first few iterations.

The present invention thus provides an algorithm to implement radix four division and radix four square-root in a shared hardware for the IEEE standard for binary floating point format. The algorithm is best suited to be implemented in either off-the-shelf components or as a portion of a VLSI floating-point chip. In one embodiment, the core iteration involves an 8-bit carry look-ahead adder, a multiplexer to convert two's complement to sign magnitude, a 19-term next quotient/root prediction PLA, a divisor/root multiple selector, and a carry save adder. At the end, two iterations of carry look-ahead additions across the length of the mantissa are required to generate the quotient/root in a correctly rounded form. Despite its simplicity in the hardware requirement, the algorithm takes only about 30 cycles to compute double precision division or square-root. Extending the algorithm to radix eight or higher division/square-root is possible.

For a fuller understanding of the nature and advantages of the invention, reference should be made to the ensuing detailed description taken in conjunction with the accompanying drawings.

DETAILED DESCRIPTION OF THE PREFERRED EMBODIMENTS

This description will not discuss how the result exponent is obtained since its implementation is obvious to one of skill in the art. The following description shows how the quotient and root bits are formed as were as the associated rounding technique at the end.

Division

In the following embodiment, division is implemented with radix 4 SRT. Two quotient bits are produced per iteration, the partial remainder is kept in a redundant form, the sum and carry are produced from carry save adders, the quotient bits are kept in a redundant form (Q and Q−1 form), and the next quotient bits are predicted using a symmetric prediction PLA.

The basic SRT division algorithm (Atkins, supra) involves solving the recursive relationship:

$$P_{j+1} = r * P_j - q_{j+1} * d \quad (1)$$

with the range restriction:

$$|P_{j+1}| <= \frac{n}{r-1} * d \quad (2)$$

where
Pj=partial remainder in j-th cycle (Po=dividend)
r=radix
qj=quotient digit selected in ]-th cycle
d=divisor
n=number of divisor multiples (not including zero)

Figure 1:
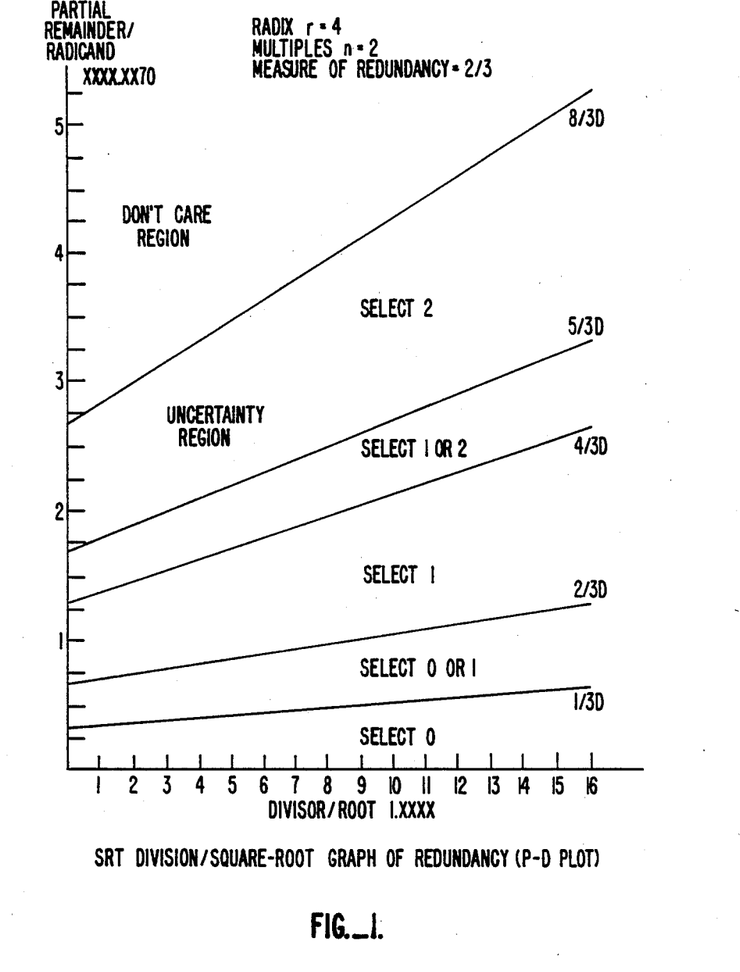
FIG. 1 is a partial remainder-divisor plot for radix=4 and n=2 of equation 2.

The P-D (Partial Remainder - Divisor) Plot with r=4 and n=2 is shown in FIG. 1. To find the boundaries defining each redundant region, substitute into the above equation the minimum and maximum values of p(j+1):

$$r*P_j = \pm \tfrac{8}{3}*d - q_{j+1}*d \quad (3)$$

with q(j+1)=−2, −1, 0, +1, +2

This radix four SRT division is implemented with minimal redundancy (measure of redundancy=$\tfrac{2}{3}$), i.e., with the choice of divisor multiples to be only one times and two times the divisor. Although having three times the divisor as a divisor multiple choice (maximally redundant) will simplify the radix four next quotient prediction PLA, the generation of this multiple is non-trivial. This non-trivial generation, however, has been done to implement radix 8 SRT division in Weitek chip WTL2264.

FIG. 2 shows a block diagram of an apparatus for implementing division and square-root calculations according to the present invention. A dividend or radicand is supplied on input lines 10 to partial remainder/radicand sum and carry registers 12. The upper eight bits of registers 12 are provided to an 8-bit carry look-ahead adder (CLA) 14. The output of CLA 14 is provided to a complementor 16. Complementor 16 provides a positive output to a next divisor/root prediction PLA 18. Complementor 16 flips the number if it is negative so that a positive number is always supplied to PLA 18. The other inputs to PLA 18 are provided by multiplexer 42, which supplies 4 bits of the dividend for division or 5 bits from a look-up PLA 40 for a square-root. The output of PLA 18 is supplied through a multiplexer 20 to a quotient/root register 22 and a divisor/root multiple selector 24. The output of divisor/root multiple selector 24 is combined with the output of registers 12 in a carry save adder 26. The output of carry save adder 26 is shifted in a shifter 28 and supplied back to the input of registers 12. A 2-bit shift indexing register 38 provides select lines to the other registers to insure that the proper positions are enabled during each iteration.

Figure 4:
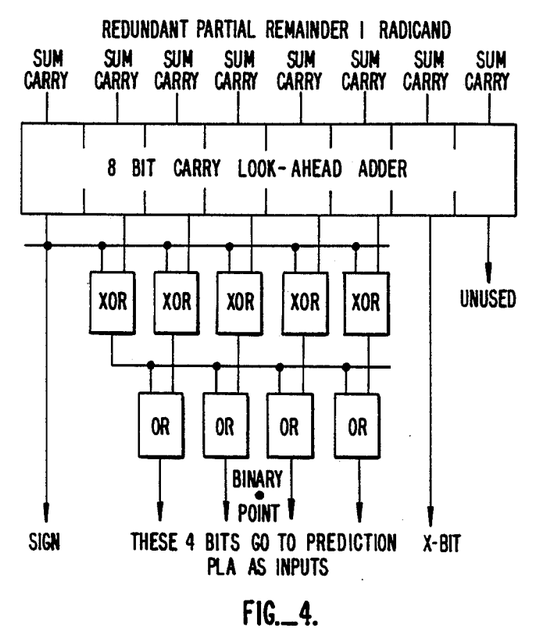
FIG. 4 is a block diagram showing the 8 bit CLA and complementor of FIG. 2 in more detail.
Figure 5:
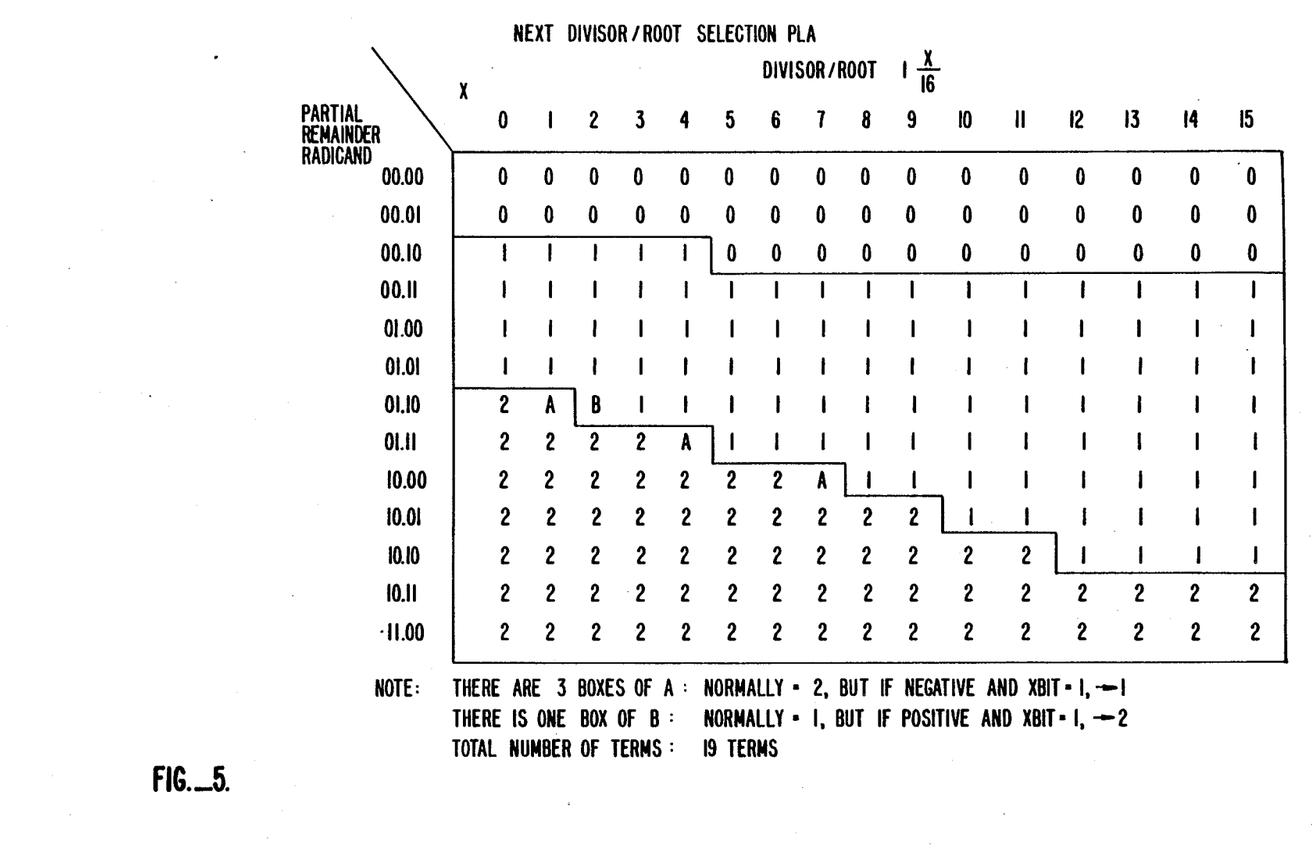
FIG. 5 is a table showing the contents of the next divisor/root selection PLA of FIG. 2.

In operation, for division, an 8-bit carry look-ahead addition is provided by CLA 14 on the upper eight bits of the partial remainder. This converts the partial remainder from two's complement form into sign magnitude form. If the sign is negative, complementor 16 flips the number so that a positive value is supplied to PLA 18. FIG. 4 snows CLA 14 and complementor 16 in more detail. The sign bit from CLA 14 is passed on a line 15 to quotient/root register 22 and divisor/root multiple selector 24. The magnitude from complementor 16 is passed to PLA 18 which then selects a next quotient prediction according to the table shown in FIG. 5. Quotient/root register 22 receives the PLA output and stores them in both a Q and Q−1 form as shown in more detail in FIG. 3 for a 2 bit slice. Although not used for the iterations of a division operation, these dual forms will be used for the iterations of a square-root calculation.

Figure 3:
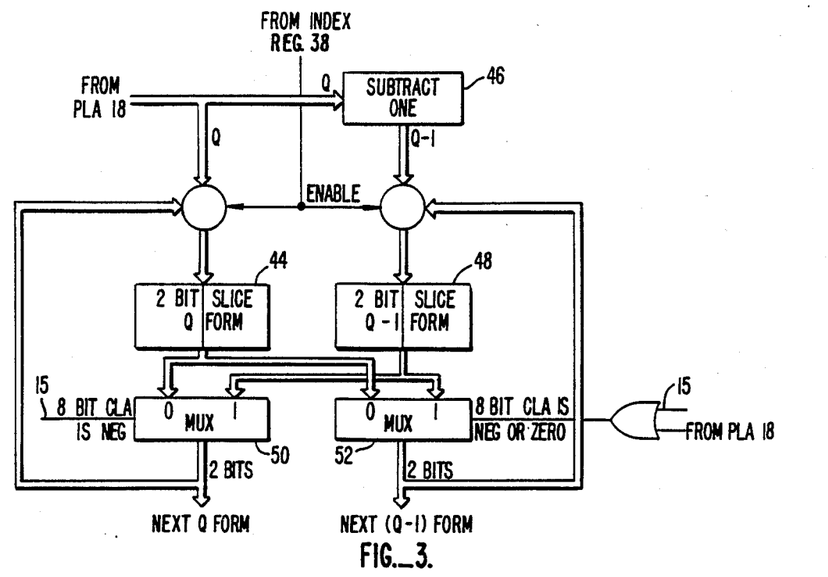
FIG. 3 is a block diagram showing the formation of the quotient/root in Q and Q−1 forms.

As shown in FIG. 3, the 2 bit Q from PLA 18 is provided to a 2 bit slice 44 of the quotient/root register. A 1 is subtracted from this value by a logic circuit 46 to give the Q−1 form which is supplied to a 2 bit portion 48 of the quotient/root register. The appropriate 2 bit portion is determined by an enable line from index register 38. In the event that the subtraction of 1 to form a Q−1 requires a "borrow" from other digit positions, multiplexers 50 and 52 enable a swap of the Q and Q−1 forms in the previous 2 bit portion to accomplish this. Thus, if a borrow is required, circuits identical to that of FIG. 3 for previous 2 bit slices enable the swapping or the Q and Q−1 forms as needed. The swap is performed by providing the output of one of multiplexers 50 and 52 back to registers 44 and 48. The output of multiplexers 50 and 52 is also supplied to divisor/root multiple selector 24 of FIG. 2.

Divisor/root multiple selector 24 multiplies the divisor by one of −2, −1, 0, +1 or +2. Each of these operations can be done by simply changing the sign and shifting the bits. The sign is provided from control line 15 and a value of 0, −1 or 2 from PLA 18 determines the shift. This value is then combined with the output of the partial remainder registers 12 and provided back to the input of the partial remainder registers 12 and the process is repeated. At the end of the iteration cycles, the result is passed from shifter 28 on data lines 30 to a multiplexer 32 and a carry look-ahead adder 34. On this pass, the sign or the remainder is determined. Depending upon the sign of the remainder, either the Q or Q−1 form the quotient from register 22 is supplied through multiplexer 32 to carry look-ahead adder 34. Carry look-ahead adder 34 is then used for rounding.

A controller 36 provides the clocking control signals necessary to operate the apparatus as discussed. An example of a program for controller 36 to accomplish square-root and division calculations according to the present invention is shown in Appendix II.

The block diagram of FIG. 2 thus performs division according to equation (1). The recursive iteration given in equation (1) causes the selected divisor multiple to be subtracted from the current Partial Remainder (PR) to form the next PR. On each iteration, the subtraction is done in parallel bit by bit using Carry Save Adders (CSA), instead of performing a full mantissa width Carry Look-ahead Adder (CLA). Consequently, the iteration cycle time can be made much shorter, and also the cycle time will become relatively independent of the length of the mantissa precision. The CSA technique causes the PR to be in redundant sum and carry forms. This creates extra hardware complexities. First, an extra set of registers is needed to hold the carry bits. Second, the PR still needs to be converted into a non-redundant form in every cycle to predict the next quotient digit, but, due to the size or the comparison constant in the overlapped redundant region of FIG. 1, a small 8 bit CLA on the upper bits is quite sufficient. Third, at the end of divide iterations, when the actual sign of the PR and the sticky bit need to be known, a full mantissa width CLA is needed to convert the PR into a non-redundant form. And last, a slightly more complex next quotient prediction PLA is needed. Obviously, the trade-off here is hardware complexity versus speed. For VLSI implementation, the extra complexity is minimal. Moreover, the speed advantage becomes greater for longer mantissa width (e.g. double precision, extended precision).

Conventionally, as the quotient digit is produced every cycle, the redundant digits are stored in positive and negative shift registers. The final quotient is then obtained by subtracting the content of the negative from the positive registers using a full mantissa width CLA. The algorithm described herein, on the other hand, keeps these redundant quotient digits in a slightly modified form, i.e. the "Q" and "Q minus 1 (Q−1)" form FIG. 3). The bit strings are converted into Q and Q−1 forms sequentially as the positive/negative quotient digits are generated every cycle.

One advantage of this technique is that the final quotient may be readily available at the end of the iterations, thus eliminating the need to perform a full mantissa width CLA (CLA 34 is only used to determine the sign and do rounding). Another advantage is that it shares well with the root formation in the square-root.

To summarize, the total delay for each divide iteration cycle is a combination of the following steps. At the beginning of each cycle, an 8 bit CLA is performed on the sum and carry forms of the current PR, and the result is then converted from two's complement into sign magnitude (FIG. 4). The magnitude part is then passed to the 19 term "next quotient prediction PLA (FIG. 5)". The PLA outputs then select the divisor multiple. In parallel, these PLA outputs are transformed into Q and Q−1 forms and stored into the quotient registers. Using CSA, the selected divisor multiple is subtracted from the current PR to form the next PR. The result is stored in the PR registers, and the cycle repeats.

Square-Root

A square-root calculation is a close analog of division the radicand is similar to the dividend, the partial radicand is similar to the partial remainder, the root is similar to the divisor, and also the root is similar in formation to the quotient. Square-root iteration requires the root bits to be known each time, because the root bits must be available to form the next partial radicand. Naturally, the prior art one bit at a time restoring binary square-rooting is the simplest to implement, since the non-redundant root is readily formed and can be used directly in the subtraction of the current Partial Radicand (PR) to form the next PR. A redundant one bit at a time is slightly more complex, since the redundant root bits must be converted on the fly every time into a non-redundant form (Majerski, supra).

An extension of restoring one bit at a time square-root into a higher radix is possible by performing parallel CLAs on the full precision PR based on all possible root combinations. For instance, restoring radix four square-root would require 3 parallel CLAs to obtain comparisons on (01, 10, 11) possible next root digit combinations. This approach requires a lot of hardware and the iteration cycle time will be long due to the delay in performing full width CLA.

The present invention uses a higher radix non-restoring square-rooting process with redundant root selection. This has a speed advantage because redundancy permits a lesser number or partial radicand bits to be compared. Therefore, a shorter CLA, independent of the length of the mantissa precision, is sufficient to predict the next root digit.

The binary square root extraction is based on "completing the square" according to the following equation (K. Hwang, "Computer Arithmetic: Principles, Architecture and Design", New York, John Wiley and Sons, Inc., 1978):

$$|P_{j+1}| <= \frac{n}{r-1} * Q \quad (5)$$

where
Pj=partial radicand in j-th cycle (Po=radicand)
r=radix
qj=root digit selected in j-th cycle
Qj=partially developed root in j-th cycle (Q=final root)
n=number of root multiples (not including zero)

Thus the recursive relationship for square-root differs from the SRT division recursion only in the formation of the divisor/root multiples, and in the range restriction given in equation (5) that affects the size of the uncertainty region in the next root prediction PLA. Consequently, the potential of sharing the same logic and hardware with radix four division is enormous, and the performance speed-up is very attractive.

Figure 6:
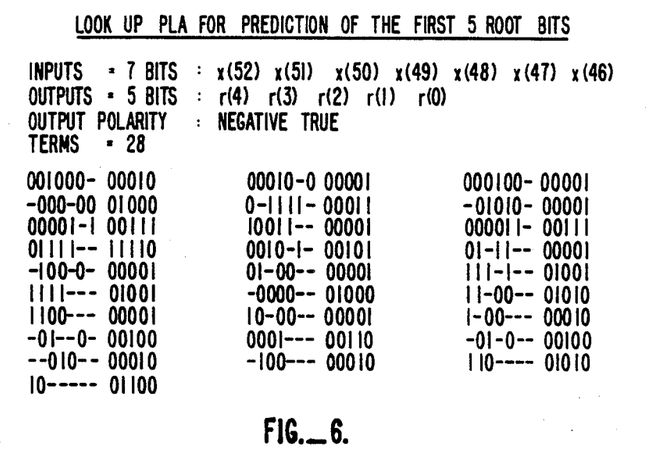
FIG. 6 is a table showing the contents of the initial look-up PLA of FIG. 2.

The calculation of radix four square-root is done as follows. Prior to initiating the square-root iterations, the exponent of the radicand must first be examined. If the unbiased exponent is odd, the mantissa is left shifted by one bit (The exponent manipulation is simple and thus is not shown in FIG. 2). In order to start predicting the next 2 root bits, root prediction PLA 18 needs to know approximately where the root is. As shown in FIG. 1 on the x-axis, five bits of the root (including the hidden bit) must be known. There are many ways to obtain the initial 5 bits of the root. A look-up PLA 40 is chosen to do this in the embodiment of FIG. 2. FIG. 6 shows the look-up PLA table. The look-up PLA size is 28 terms with the most significant 6 bits of the mantissa plus the LSB of exponent (the odd and even exponent bit) as the inputs and the most significant 5 bits of the root as the outputs.

The output of PLA 40 is supplied through multiplexer 20 to quotient/root register 22 and divisor/root multiple selector 24. Three initial square-root iterations will be performed using the 5 predicted root bits to obtain the partial radicand. Subsequently, the next 2 root bits will be produced by root selection PLA 18 on every iteration—a similar iterative process as done in division.

Figure 7:
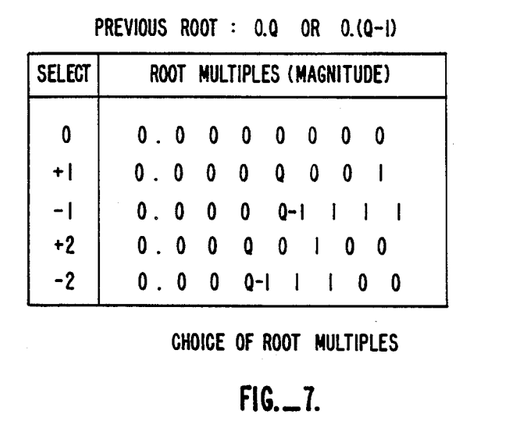
FIG. 7 is a table of the root multiples formed by the divisor/root multiple select block of FIG. 2.

One tricky point in performing higher radix square-root is the generation of the root multiples (plus or minus times one of the root and plus or minus twice the root). Using equation (4), the root multiple can be calculated. FIG. 7 snows the root multiples to be selected. Since forming root multiples requires immediately the non-redundant form of the partially developed root ($Q_j$), the advantage of storing the quotient/root digit string in "Q" and "Q−1" forms becomes clear. If the next root digit is positive, the "Q" form is used to generate the root multiple. The "Q−1" form is used if the next root digit is negative.

Again, similar to division, the delay path on each square-root iteration is as follows. An 8 bit CLA is performed on the sum and carry of the current Partial Radicand (PR), and the 2's complement result is converted into a sign magnitude form. The magnitude part together with 4 initial root bits (out of 5 bits excluding the hidden bit that are obtained from look-up PLA 40) go to next root prediction PLA 18 (19 terms) to determine the next two root bits and the next root multiple. The sign determines whether subtraction or addition must be done to form the next PR. The cycle then repeats.

Two examples of double precision square-rooting process using this algorithm are set forth in Appendix I, showing how the partial radicand registers change on every iteration cycle.

Uncertainty Region of the Next Quotient/Root Prediction PLA

The P-D plot in FIG. 1 shows on the X-axis that the divisor/root is in the range of +1 to +2. This is indeed dictated by the IEEE standards: the hidden bit is to the left of the binary point, and the mantissa is represented as a positive magnitude. Let us examine the uncertainty range on the X-axis for each divide and square-root. For division, the divisor is already known to its full precision, its position on the X-axis is fixed. Through trial and error on the uncertainty region, only 4 MSB of the divisor (excluding the hidden bit) are chosen to be examined. These truncated divisor-bits have an uncertainty range of a size of at most +1 Unit of the Least significant Place (ULP). In this case, the uncertainty range for the divisor is 1/16, which satisfies the divisor interval requirement. In the case for square-root, initially, only the radicand is known and the root position in the range of +1 to +2 is not yet known. Using several upper bits of the radicand, it is possible to obtain the upper 5 root bits (including the hidden bit). look-up PLA implementation is quite practical, since the size is not too large (28 terms). Since subsequent root digits to be produced are still redundant, these truncated root-bits have an uncertainty range extending to not only +1 ULP (+1/16) but also −1 ULP (−1/16). The uncertainty range for the root is twice the divisor, therefore the final size of the uncertainty range on the X-axis for the shared prediction PLA is ⅛, even though the stepping size on the X-axis is still 1/16 (4 MSB examined).

The Y-axis of the P-D from FIG. 1 represents the partial remainder/radicand (PR). The plot only shows the positive half of the Y-axis. The negative half is symmetrical to the positive half around zero. Although at the start the dividend/radicand is positive, subsequent non-restoring subtractions may produce negative PRs. Unfortunately, the two's complement representation for the PR is asymmetrical around zero. On the other hand, the overlapped region in FIG. 1 allows the comparison constant to be truncated to 8 MSB of the PR. The truncated PR, while represented in two's complement, will have +2 ULP uncertainty range because the PR is truncated from its original sum and carry representation. The uncertainty range of the magnitude representation of the PR thus extends to +2 and −2 ULP. When the selection of the next quotient/root digit is done from two's complement PR, the result is an asymmetrical PLA (Taylor, supra). The size of this asymmetrical PLA is quite large, because not only does the PLA have to cover the positive and negative regions or FIG. 1, but also the negative half does not map nicely into the positive half. Therefore, if the negative two's complement truncated PR is first mapped into a sign magnitude representation, a smaller size symmetrical PLA can be utilized. The logic for this conversion is shown in FIG. 4. This conversion technique not only maps the negative half of the PR into its symmetrical counterpart, but also causes the uncertainty range on the magnitude of the PR to reduce to +1.25 ULP and −0.25 ULP.

To a certain extent, if the size on the X-axis of the uncertainty region is increased, the size on the Y-axis may be reduced (Atkins, supra). The truncated divisor/root bits that go to the PLA do not change on every iteration, but the truncated PR is always changing. Since the formation of the truncated PR involves a CLA delay (this delay depends on the width of the truncated PR), it is desirable to examine a smaller number of PR bits, even at the expense of examining more divisor/root bits. The size chosen for the uncertainty region in this invention is indeed an optimal one.

Rounding

In order to comply with IEEE specified rounding, both divide and square-root iterations must be continued until the quotient bits at Guard and Round positions are produced. The unrounded quotient bits must be selected from Q or Q−1 registers. The selection is determined by the sign of the last PR, thus a full mantissa width CLA must be performed on the last PR to compute its sign.

The sticky bit is zero if and only if the final partial remainder/radicand is exactly zero. Thus a big OR gate (not shown) following the CLA can be used to perform a zero detect logic function. A one bit normalization on the mantissa may be needed for divide operation if the bit value at the hidden bit position of the quotient is zero. Square-root operation never needs normalization.

Finally, depending on the rounding mode, the LSB, the Round bit and the Sticky bit, the quotient/root may need to be incremented at the LSB position. If so, again, performing a full mantissa width CLA will add one to the least significant bit position of the mantissa. The exponent is incremented if the mantissa overflows due to rounding.

Radix 8 or Higher Shared Division and Square-Root

Staging several hardware circuits with each performing radix 4 division/square-root in parallel can achieve a higher radix implementation. Radix 16 SRT division with stages has been reported by G. S. Taylor ("Radix 16 SRT Dividers with Overlapped Quotient Selection Stages", Proceedings of the 7th Symposium on Computer Arithmetic, June 1985, pp. 64–71). The discussion here pursues implementations of higher radix not by means of staging, rather by means of one stage hardware.

The embodiment set forth herein can be extended to radix 8 or higher. The SRT division algorithm can be applied to any radix ($2^n$) and the recursive relationship for square-root of equation (4) can still map into the SRT recursion. The major obstacles to higher radix than radix four division and square-root are the generation of divisor/root multiples (e.g. 3d, 5d, 7d, etc.) and the complexity of the next quotient/root prediction PLA. All these requirements translate directly to more hardware.

For division, the divisor multiples generation may be formed at the beginning of the divide iterations—a one time delay. But for square-root, the generation of the root multiples must be performed on the fly on every iteration. Utilizing the properties of signed digit representation (A. Avizienis, "Signed Digit Number Representations for Fast Parallel Arithmetic", IRE Transactions on Electronic Computers, EC-10, September 1961, pp. 389–400 and D. E. Atkins, "Design of the Arithmetic Units of Illrac III:Use of Redundancy and Higher Radix Methods", IEEE Transactions on Computers, C-19, No. 8, August 1970, pp. 720–732) on the quotient/root, and using modified carry save adders, it is possible to generate the root multiples on the fly. Divisor multiples can also be formed using the same hardware.

Complex prediction PLA can be simplified by transforming the divisor into a suitable range (M. D. Ercegovac, "A Higher Radix Division with Simple Selection of Quotient Digits", Proceedings of the 6th Symposium for Computer Arithmetic, June 1983, pp. 94–98). Transforming the divisor into a different range does not have much of a side effect on the quotient, given that the dividend is also transformed by the same factor. In a shared division/square-root method, the root must also be modified through the same transformation scheme as the divisor. This requires the final result for the root to be modified back by the inverse factor.

As will be understood by those familiar with the art, the present invention may be embodied in other specific forms without departing from the spirit or essential characteristics thereof. For example, CLA 14 could look at a number other than 8 of the bits from sum and carry registers 12. Accordingly, the disclosure of the preferred embodiment of the invention is intended to be illustrative, but not limiting, of the scope of the invention as set forth in the following claims.

APPENDIX I

ODD EXPONENT

What is the radicand (two 32bit integers) ?
40023456 789abcde predicted root bits :0110000

[Binary trace data omitted — multiple iterations of sel2, sel1, negate, sum, cry, root values in binary form]

Radicand = 40023456 789abcde
Final root = 3ff122cb 17ff2eb7

EVEN EXPONENT

What is the radicand (two 32bit integers) ?
3ffabcde 98765431 predicted root bits :0101010
sel2=0 sel1=1 negate=0

Appendix I (continued)

[Binary trace data: sequences of sum, cry (carry), root, sel2, sel1, negate values - illegible at this resolution]

```
root:00101001010111011110101011000001010100110011110100111101
Radicand   = 3ffabcde 98765431
Final root = 3ff4aef5 6054cfa8
```

APPENDIX II

```c
/*                                                              */
/*      Jan Fandrianto -    August 20, 1986                     */
/*      square root radix 4 - 2 bit at a time                   */
/* partial radicand is saved in sum and carry form - CSA        */
/*              64 bit version                                  */
/*                                                              */
main()
{
long mode,op1,op2,result1,result2,result3,result4;
int x,y,z,func,seed;

printf(" Please enter mode of operation (1 for interactive) : \n");
    scanf("%d",&mode);
    if (mode == 1)
    { while  (1 == 1)
        {
        printf(" What is the radicand (two 32bit integers) ? \n");
        scanf("%x %x",&op1,&op2);
        sqroot( op1,op2,  &result1,&result2, &x, &y);
        z = 0; func = 55; y = 1; x = 1;
        arith(&op1,&op2,&x, &z,&z,&z, &func,&result3,&result4,&y,&z);
        if ((result1 != result3) | (result2 != result4)) printf("error !! ");
        printf("%08x %08x %08x %08x %08x %08x\n",
                op1,op2, result1,result2,result3,result4);
        };
    }
        else
    {
```

```
    printf(" Please enter seed integer to start random data generation :\n");
    scanf("%d",&seed);
    pseudo_random(seed);

};
} sqroot(radicand1,radicand0, root1,root0, mode, status)
int    radicand1,radicand0, *root1,*root0, *mode, *status;

{ int    frd[56],frr[58],frc[58],frt[58],erd[12],ert[12],srd,srt;
int    ediff[12],temp2[58],final[64];
int    qpos[58], qneg[58], sel2,sel1,sel0,negate;
int    frp[7],prd[7];
int    cry,i,j,lbit,rbit,sbit,round;
int    ermax,ermin,frzr,nan,inv,din,inf,zro;

/* Unpack */ intcontoboo(radicand0,32,&frd[0]);
        intcontoboo(radicand1,20,&frd[32]);
        intcontoboo(radicand1 >> 20, 11, &erd[0]);
        srd = (radicand1 >> 31) & 1;  /* sign */ frd[52] = 1; frd[53] = 0;
        erd[11]  = 0;

/* detection */

APPENDIX II frzr = 0;
        for (i = 0; i < 52; i++)
                    frzr |= frd[i];
        frzr = !frzr;

ermax = 1;
        ermin = 0;
        for (i = 0; i < 11; i++)
        {
            ermax &= erd[i];
            ermin |= erd[i];
        };
        ermin = !ermin;

nan = (ermax & !frzr);
        din = (ermin & !frzr);
        inf = ermax & frzr;
        zro = ermin & frzr;
        inv = (srd & !zro);

/* square root never overflows nor underflows */

/* exponent add with 01111111111 and shift right 1 bit */ cry = 0;
        for (i = 0; i < 10; i++)   fulladd(erd[i],1,cry,&ediff[i],&cry);
        for (i = 10; i < 12; i++)  fulladd(erd[i],0,cry,&ediff[i],&cry);

for (i = 0; i < 11; i++)   ert[i] = ediff[i+1];

/* fraction left shift by one if ediff[0] == 1 */
```

```
        if (ediff[0] == 1)
        {
        for (i = 55; i > 2; i--) frr[i] = frd[i-3];
        frr[57] = frr[56] = frr[0] = frr[1] = frr[2] = 0;
        }
        else
        {
        for (i = 55; i > 1; i--) frr[i] = frd[i-2];
        frr[57] = frr[56] = frr[0] = frr[1] = 0;
        };

for (i = 0; i < 58; i++) qpos[i] = qneg[i] = frt[i] = frc[i] = 0;

/* prediction of the first 5 bits of the root using a 28-term neg-true PLA */ predict(erd[0],frd[51],frd[50],frd[49],frd[48],frd[47],frd[46],
                &prd[5],&prd[4],&prd[3],&prd[2],&prd[1]);

prd[0] = 0;
        prd[6] = !prd[5];

/* obtain the non-restored partial radicand */ for (j = 28; j > 25;j--)
        {
            i = j*2 - 52;
            recode(prd[i],prd[i+1],prd[i+2],&sel0,&sel1,
                    &sel2,&negate);
            if (negate == 1) {qneg[j*2-1]=sel1; qneg[j*2]=sel2;}
                      else   {qpos[j*2-1]=sel1; qpos[j*2]=sel2;};

cry = !negate;
            for (i = j*2+1; i < 58; i++)
                    fulladd(qpos[i],!qneg[i],cry, &frt[i], &cry);
            for (i = 0; i < j*2+1; i++) temp2[i] = 0;
            i = j*2+1;
            rootselect(sel2,sel1,negate,
                    &temp2[i-1],&temp2[i-2],&temp2[i-3]);
                    temp2[i] = ((sel1 & frt[i]) | (sel2 & negate));
            for (i = j*2+2; i < 58; i++)
                    temp2[i] = ((sel1 & frt[i]) | (sel2 & frt[i-1]));

for (i = 0; i < 58; i++)
               fulladd(frr[i],frc[i],(negate==temp2[i]),&frr[i],&frc[i]);

cry = frr[49] & frc[48];
            for (i = 50; i < 57; i++)
                    fulladd(frr[i],frc[i-1],cry, &frp[i-50], &cry);

for (i = 57; i > 2; i--)
            {  frr[i] = frr[i-2];
               frc[i] = frc[i-3];
            };
            frr[2] = frr[0];
            frc[2] = !negate;
            frr[0] = frr[1] = frc[0] = frc[1] = 0;

};

/* bodyloop */ for (j = 25; j > 0; j--)
        {
            divpla(frp[6],frp[5],frp[4],frp[3],frp[2],frp[1],frp[0],
                   prd[5],prd[4],prd[3],prd[2],prd[1],
                   &sel2,&sel1,&negate);
            if (negate == 1) {qneg[j*2-1]=sel1; qneg[j*2]=sel2;}
                      else   {qpos[j*2-1]=sel1; qpos[j*2]=sel2;};
```

```
        cry = !frp[6];
        for (i = j*2+1; i < 58; i++)
                fulladd(qpos[i],!qneg[i],cry, &frt[i], &cry);
        for (i = 0; i < j*2+1; i++) temp2[i] = 0;
        i = j*2+1;
        rootselect(sel2,sell,negate,
                &temp2[i-1],&temp2[i-2],&temp2[i-3]);
                temp2[i] = ((sell & frt[i]) | (sel2 & negate));
        for (i = j*2+2; i < 58; i++)
                temp2[i] = ((sell & frt[i]) | (sel2 & frt[i-1]));

for (i = 0; i < 58; i++)
            fulladd(frr[i],frc[i],(negate==temp2[i]),&frr[i],&frc[i]);

cry = frr[49] & frc[8];
        for (i = 50; i < 58; i++)
                fulladd(frr[i],frc[i-1],cry, &frp[i-50], &cry);

temp2[55] = frc[55];
        temp2[56] = frr[56];

for (i = 57; i > 2; i--)
        {   frr[i] = frr[i-2];
            frc[i] = frc[i-3];
        };
        frr[2] = frr[0];
        frc[2] = !negate;
        frr[0] = frr[1] = frc[0] = frc[1] = 0;

};

/*  upon exiting bodyloop, I have got gbit and rbit, and need to determine
    the actual sign of partial radicand.  Actually gbit is not needed, be-
    cause the root is always already normalized.   */ cry = 0;
    for (i = 0; i < 58; i++)
            fulladd(frr[i],frc[i],cry,&frr[i],&cry);

fulladd(temp2[55],temp2[56],cry,&temp2[57],&cry);

for (i = 0; i < 58; i++) frt[0] |= frr[i];    /* sticky bit */

/* computing the actual (non-redundant) root */ j = 0;
    cry = !temp2[57];
    for (i = j*2+1; i < 58; i++)
            fulladd(qpos[i],!qneg[i],cry, &frt[i], &cry);

lbit = frt[3];
    rbit = frt[2];
    sbit = frt[1] | frt[0];

round = (lbit & rbit) | (rbit & sbit);

if (round == 1)
    {
    cry = 1;
    for (i = 3; i < 56; i++)
            fulladd(frt[i], 0, cry, &frt[i], &cry);
    };

if (frt[55] == 0)
    { cry = 1;
      for (i = 0; i < 11; i++) fulladd(ert[i], 0, cry, &ert[i], &cry);
```

```
            for (i = 3; i < 55; i++) frt[i] = frt[i+1];
        };

/* final sign */ srt = srd;

/* status and rounding mode are not implemented in this model, trivial */

/* pack */ for (i = 0; i < 32; i++) final[i] = frt[i+3];
    for (i = 32; i < 52; i++) final[i] = frt[i+3];
    for (i = 0; i < 11; i++) final[i+52] = ert[i];
    final[63] = srt;

boocontoint(&final[0], 32, root0);
    boocontoint(&final[32], 32, root1);

predict(rd11,rd10,rd9,rd8,     ,rd6,rd5,
        rt4,rt3,rt2,rt1,rt0)
int     rd11,rd10,rd9,rd8,rd7,rd6,rd5,
        *rt4,*rt3,*rt2,*rt1,*rt0;
{
int temp1[29];

temp1[1]  = (!rd11 & !rd10 & rd9 & !rd8 & !rd7 & !rd6);
temp1[2]  = (!rd11 & !rd10 & !rd9 & rd8 & !rd7 & !rd5);
temp1[3]  = (!rd11 & !rd10 & !rd9 & rd8 & !rd7 & !rd6);
temp1[4]  = (!rd10 & !rd9 & !rd8 & !rd6 & !rd5);
temp1[5]  = (!rd11 & rd9 & rd8 & rd7 & rd6);
temp1[6]  = (!rd10 & rd9 & !rd8 & rd7 & !rd6);
temp1[7]  = (!rd11 & !rd10 & !rd9 & rd8 & rd7 & rd5);
temp1[8]  = (rd11 & !rd10 & !rd9 & rd8 & rd7);
temp1[9]  = (!rd11 & !rd10 & !rd9 & !rd8 & rd7 & rd6);
temp1[10] = (!rd11 & rd10 & rd9 & rd8 & rd7);
temp1[11] = (!rd11 & !rd10 & rd9 & rd8 & rd6);
temp1[12] = (!rd11 & rd10 & rd8 & rd7);
temp1[13] = (rd10 & !rd9 & !rd8 & !rd6);
temp1[14] = (!rd11 & rd10 & !rd8 & !rd7);
temp1[15] = (rd11 & rd10 & rd9 & rd7);
temp1[16] = (rd11 & rd10 & rd9 & rd8);
temp1[17] = (!rd10 & !rd9 & !rd8 & !rd7);
temp1[18] = (rd11 & rd10 & !rd8 & !rd7);
temp1[19] = (rd11 & rd10 & rd9 & !rd8);
temp1[20] = (rd11 & !rd10 & !rd8 & !rd7);
temp1[21] = (rd11 & !rd9 & !rd8);
temp1[22] = (!rd10 & rd9 & !rd6);
temp1[23] = (!rd11 & !rd10 & !rd9 & rd8);
temp1[24] = (!rd10 & rd9 & !rd7);
temp1[25] = (!rd9 & rd8 & !rd7);
temp1[26] = (rd10 & !rd9 & !rd8);
temp1[27] = (rd11 & rd10 & !rd9);
temp1[28] = (rd11 & !rd10);

*rt4 = !(temp1[10]);
*rt3 = !((temp1[4]  | temp1[10] | temp1[15] | temp1[16] | temp1[17])
       | (temp1[18] | temp1[27] | temp1[28]));
*rt2 = !((temp1[7]  | temp1[9]  | temp1[10] | temp1[11] | temp1[22])
       | (temp1[23] | temp1[24] | temp1[28]));
*rt1 = !((temp1[1]  | temp1[5]  | temp1[7]  | temp1[9]  | temp1[10] | temp1[18])
       | (temp1[21] | temp1[23] | temp1[25] | temp1[26] | temp1[27]));
*rt0 = !((temp1[2]  | temp1[3]  | temp1[5]  | temp1[6]  | temp1[7]  | temp1[8])
       | (temp1[9]  | temp1[11] | temp1[12] | temp1[13] | temp1[14])
       | (temp1[15] | temp1[16] | temp1[19] | temp1[20]));

}
```

What is claimed is:

1. An apparatus for performing division and calculating a square root comprising:
   partial remainder/radicand register means for storing a partial remainder or radicand in sum and carry form;
   a carry save adder having an input coupled to an output of said partial remainder/radicand register means and an output coupled to an input of said partial remainder/radicand register means;
   quotient/root register means for storing a quotient or root and having an output coupled to said carry save adder;
   a carry look-ahead adder coupled to receive a plurality of the upper bits from said partial remainder/radicand register means;
   prediction look-up table means, having an input coupled to said carry look-ahead adder and an output coupled to said quotient/root register means, for producing a predicted next divisor or root; and
   initial look-up table means, having an input coupled to receive a radicand and an output coupled to said quotient/root register means, for producing an initial plurality of digits of a root.

2. The apparatus of claim 1 further comprising a complementor coupled between said carry look-ahead adder and said prediction look-up table means for complementing any negative outputs of said carry look-ahead adder.

3. The apparatus of claim 1 further comprising a multiplexer for coupling one of the outputs of said prediction look-up table means and said initial look-up table means to said quotient/root register means.

4. The apparatus of claim 3 further comprising a divisor/root multiple selector means, coupled to an output of said multiplexer and an output of said quotient/root register, for shifting and complementing an output of said quotient/root register with the amount of the shift being determined by the output of said multiplexer and providing said shifted/complemented output to said carry save adder.

5. The apparatus of claim 1 further comprising a shifter coupled to the output of said carry save adder.

6. The apparatus of claim 1 further comprising a full mantissa width carry look-ahead adder coupled to an output of said carry save adder.

7. The apparatus of claim 1 wherein said look-up table means comprise programmable logic arrays.

8. The apparatus of claim 1 wherein said quotient/root register means includes means for storing said quotient/root register in Q and Q−1 forms.

9. The apparatus of claim 1 wherein said initial look-up table provides the initial 5 bits of a root.

10. A method for performing division using the apparatus of claim 1 comprising the steps of:
    (a) providing a dividend and a divisor;
    (b) producing a partial remainder from said dividend and said divisor;
    (c) converting an upper plurality of bits of said partial remainder into sign and magnitude form using a carry look-ahead adder;
    (d) using a prediction look-up table to predict the next quotient bits from said upper plurality of bits of said partial remainder in sign and magnitude form;
    (e) shifting and complementing said divisor in accordance with the output of said prediction look-up table;
    (f) combining the result of step (e) and said partial remainder in a carry save adder;
    (g) shifting the result of step (f) to give a new partial remainder;
    (h) repeating steps (c)-(g) for a plurality of iterations to provide a predetermined precision number;
    (i) determining the Q and Q−1 forms of the result of step (h);
    (j) determining the sign of the remainder after said iterations; and
    (k) selecting one of said Q and Q−1 forms in accordance with the sign of said remainder to provide a final quotient.

11. A method for calculating a square root comprising the steps of:
    (a) providing a radicand to an initial look-up table;
    (b) providing an initial 2 bits from said initial look-up table to a quotient/root register and a divisor/root multiple selector;
    (c) shifting and complementing the output of said quotient/root register in accordance with said 2 bits from said initial look-up table and providing the result to a carry save adder;
    (d) shifting the output of said carry save adder and providing the shifted output of said carry save adder to a partial remainder/radicand register;
    (e) repeating steps (b)-(d) for a next 2 bits from said initial look-up table;
    (f) repeating steps (b)-(d) for a final bit from said initial look-up table;
    (g) converting a plurality of the upper bits of said partial remainder/radicand register into sign and magnitude form and providing the magnitude to a prediction look-up table;
    (h) providing the output of said prediction look-up table to said quotient/root register and said divisor/root multiple selector;
    (i) shifting and complementing the output of said quotient/root register in accordance with the output of said prediction look-up table and providing the result to said carry save adder;
    shifting the output of said carry save adder and providing said output back to said partial remainder/radicand register; and
    (k) repeating steps (g)-(j) above for a plurality of iterations.

12. An apparatus for performing division and calculating a square root comprising:
    partial remainder/radicand register means for storing a partial remainder or radicand in sum and carry form;
    a carry save adder having an input coupled to an output of said partial remainder/radicand register means and an output coupled to an input of said partial remainder/radicand register means;
    quotient/root register means for storing a quotient or root in Q and Q−1 forms and having an output coupled to said carry save adder;
    a carry look-ahead adder coupled to receive a plurality of the upper bits from said partial remainder/radicand register means;
    prediction look-up table means, having an input coupled to said carry look-ahead adder and an output coupled to said quotient/root register means, for producing a predicted next divisor or root;
    initial look-up table means, having an input to receive a radicand and an output occupied to said quotient/root register means, for producing an initial plurality of digits of a root;
a complementor coupled between said carry look-ahead adder and said prediction look-up table means for complementing any negative outputs of said carry look-ahead adder;
a multiplexer for coupling one of the outputs of said prediction look-up table means and said initial look-up table means to said quotient/root register means;
a divisor/root multiple selector means, coupled to an output of said multiplexer and an output of said quotient/root register means, for shifting and complementing an output of said quotient/root register means with the amount of the shift being determined by the output of said multiplexer and providing said shifted/ complemented output to said carry save adder;
a shifter coupled to the output of said carry save adder; and
a full mantissa width carry look-ahead adder coupled to an output of said carry save adder.

* * * * *